Jan. 26, 1943.　　　L. V. WHISTLER　　　2,309,146
FISHING REEL SPOOL
Filed Feb. 4, 1939　　　2 Sheets-Sheet 1
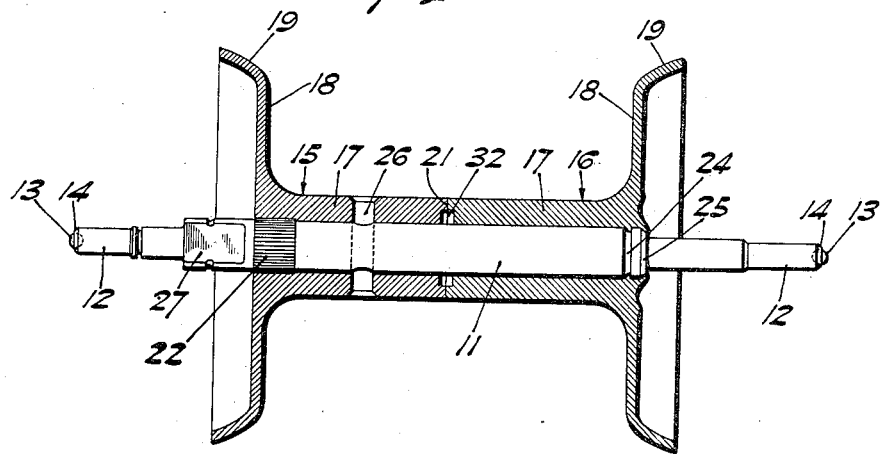
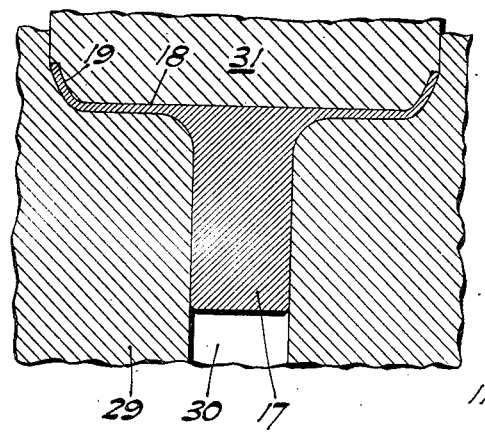
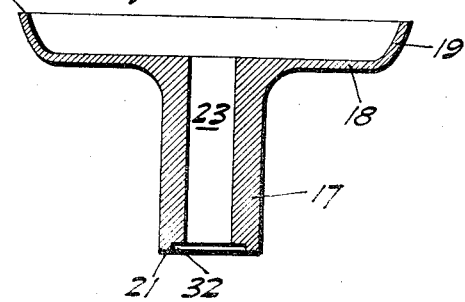
INVENTOR
LAWRENCE V. WHISTLER
BY
Beau, Brooks, Buckley & Beau.
ATTORNEYS Jan. 26, 1943.  L. V. WHISTLER  2,309,146
FISHING REEL SPOOL
Filed Feb. 4, 1939   2 Sheets-Sheet 2

INVENTOR
LAWRENCE V. WHISTLER
BY
Bean Brooks, Buckley & Bean.
ATTORNEYS

Patented Jan. 26, 1943

2,309,146

UNITED STATES PATENT OFFICE 2,309,146

FISHING REEL SPOOL

Lawrence V. Whistler, Kenmore, N. Y., assignor to Hyla F. Maynes and Emma C. Maynes, North Tonawanda, N. Y.

Application February 4, 1939, Serial No. 254,666

2 Claims. (Cl. 242—118)

The present invention relates to improved spools for fishing reels and the like.

Such spools usually comprise a hub and spaced flanges between which fishing line is wound around the hub, and journal parts extending from the ends of the hub, substantially axially thereof, for engagement in bearings provided in a suitable spool support.

Heretofore one usual method of manufacture of such spools has been to machine the entire structure consisting of the hub, the flanges and the journal portions from a single piece of metal or other material. Such integral spools are expensive to manufacture due to the great amount of machine work required and relatively large quantity of metal which is lost by being cut away during the manufacturing operations.

Another method of manufacture has consisted of forming the flange parts separately, sometimes by stamping them from sheets of metal, and of then securing them to the hub part. Such composite spools are much less expensive to manufacture than those which are integral, but they have insufficient strength and rigidity and are too easily broken apart or deformed at the junctures of the several parts thereof.

According to the present invention these disadvantages are overcome by forming each flange integral with a hub portion, which may be done by a cold-pressing operation, and by thereafter securing two such integral units upon a spindle, by a spinning operation. With this method improved composite spools which are rigid, strong and durable may be produced quickly and inexpensively.

These and other objects and advantages will become apparent from the following description of typical forms of the improved spool, and of a typical example of the new method employed, the description being made in connection with the accompanying drawings, wherein:

Fig. 1 is a sectional view taken longitudinally through the spool;

Fig. 2 is a similar sectional view of one of the flange and hub units, the view also showing the die in which the units are formed by a cold-pressing or molding operation;

Fig. 3 is a longitudinal sectional view of the flange and hub unit after being machined;

Fig. 4 is a fragmentary sectional view showing one flange and hub unit assembled on the spindle of the spool;

Fig. 5 is a fragmentary sectional view like Fig. 4, but showing the flange and hub unit secured to the spindle by a spinning operation;

Figures 6, 9:
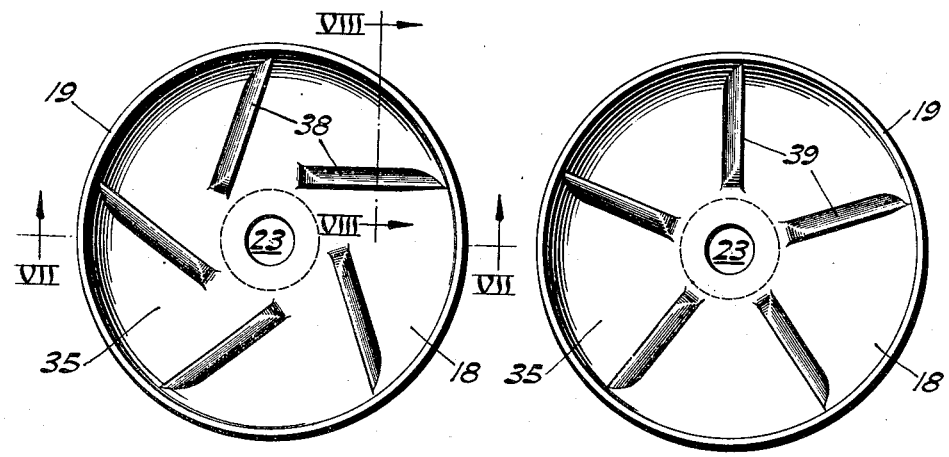
Fig. 6 is an elevation of a modified form of flange and hub unit.
Fig. 9 is a view similar to Fig. 6, illustrating another alternate structure of flange and hub unit.

As shown in Fig. 1, the spool, preferably formed of metal or material that may be worked similarly to metal, has a spindle or shaft 11 which may have end portions 12 serving as journals to be mounted in suitable bearings, not shown. The end faces 14 of journal portions 12 may be recessed, and hardened balls 13, which serve as end thrust bearings, may be secured therein by a spinning operation wherein the metal of the spindle adjacent the end faces thereof is formed over balls 13 sufficiently to hold them in place.

Secured to the spindle are two substantially similar, but reversed, flange and hub units 15 and 16. Each comprises a hub portion 17 and an integral flange 18 which preferably is cupped as indicated at 19. End faces 21 of the hub portions 17, 17 are in abutment, so that the outer cylindrical surfaces of the portions 17, 17 produce the effect of a single, continuous hub.

Shaft 11 has a knurled portion 22 engaged with the hub of unit 15 in the outer end of bore 23 thereof. Adjacent the outer end of unit 16 the spindle 11 has an annular groove 24 into which metal from part 16 is engaged. Likewise, metal of unit 16 is engaged over beveled surface 25 of the spindle. By this association of the parts both units 15 and 16 are held against axial and angular displacement relative to spindle 11.

Other characteristics of the spool include a transverse bore 26 through hub portion 17 and spindle 11 for passing one end of a fishing line to be wound on the spool, and a flat 27 on the spindle for engagement with means for rotating or controlling rotation of the spool.

In forming the improved spool, the spindle 11 is preferably made of steel and is worked to the desired form by suitable machining operations and a knurling operation. The unit 15, or 16, is formed by a cold-pressing operation wherein a blank, preferably a piece of aluminum or other light metal of cylindrical form, is placed in a die 29 and is therein formed by a punch 31 to the shape indicated in Fig. 2, the die and punch being mounted in a suitable press, not shown. In this operation, metal comprising the hub portion 17 of each of the units 15 and 16 is extruded from the blank into the opening in the die in the same operation that the cup shaped flange 18, 19 is formed. Metal of the blank fills the available spaces between the punch and die to form flange portions 18, 19, the remainder of the metal being forced into the opening in the die, thereby forming hub portion 17. Thereafter the punch is raised and the unit 15, 16 may be removed from the die by a conventional knockout pin (not shown) operating in opening 30 of the die. While I prefer to press the units 15, 16 while the metal thereof is cold, it will be understood that the metal blanks may be heated prior to being molded into shape between the parts 29, 31.

After the forming operation the units 15 and 16 are finished by drilling bore 23 through the hub portions 17 thereof and finishing the end faces thereof. The inner end face 21 of each unit is preferably slightly recessed, as indicated at 32, during the finishing operation, in order that any slight deformation of the face adjacent bore 28 incident to mounting the units upon spindle 11, will not prevent accurate matching of the abutting portions of faces 21, thereby assuring continuity of the outer cylindrical surfaces of the adjacent hub parts in the finished spool. The finishing of the outer end faces of units 15 and 16 merely consists of trimming metal from the rim or outer edge 33 of flange 18, 19.

Unit 15 is then pressed onto the spindle 11, from the right as the parts appear in Fig. 1, causing the spindle to tightly engage the wall of bore 23 and the ridges of knurled portion 22 to bite into the metal of hub 17 adjacent the outer end thereof. Since these ridges are slightly raised above the adjacent surface of spindle 11, cooperating shoulders are thus formed on the spindle and unit 15 which prevent axial displacement of the unit from the left end of the spindle, as the parts appear in Fig. 1. The ridges of the knurling are in effect splines engaging complementary splines produced on the interior of unit 15 when the latter is pressed onto the spindle, thereby positively keying these two parts together.

Unit 16 is next pressed onto the spindle causing the walls of its bore 23 to tightly engage the spindle and bringing end faces 21 of units 15 and 16 into abutment. After this operation the relation of parts 11 and 16 is substantially as shown in Fig. 4.

They are then subjected to a spinning or swaging operation wherein a tool 34, indicated in Fig. 5, is forced against and into the central portion 35 of the outer end face of unit 16 as the latter, together with the spindle, is rapidly rotated by suitable means, not shown, about the axis of the spindle. This results in the metal of unit 16 being worked into annular groove 24 in the spindle as indicated at 36, and over the beveled surface 25 as indicated at 37, thereby positively securing the unit to the spindle.

The spool is completed by drilling transverse bore 26, through unit 17 and the spindle, for passing and securing one end of a fishing line.

It will be understood that spools produced by the inexpensive method hereinbefore described are strong and rigid, particularly since the flanges 18, 19 are formed integrally with the hub portions 17 by a cold-pressing operation and since the flange and hub units are rigidly secured to the spindle. The latter is assured by the abutment of units 15 and 16, by the relatively great length of their press-fit engagement with spindle 11, and by the positive interlocks connecting the units to the spindle.

If additional rigidity of the flanges 18, 19 of the spools is desired without material increase in weight, reinforcing ribs may be proivded thereon, as in the modified forms of units 15, 16 shown in Figs. 6 to 9, inclusive. In the form shown in Figs. 6, 7 and 8 the ribs, designated 38, extend from the cupped portion 19 of the flange 18 and terminate adjacent the hub portion 17, leaving the central portion 35 of the outer face of the unit clear for engagement by tool 34. In this form of unit the ribs radiate angularly, lying in planes substantially tangential to the outer surface of hub portion 17.

With this arrangement the ribs will act as an air brake resisting rapid rotation of the spool. The ribs will function much like an air blower and therefore, in addition to a braking action, will serve to dry water from adjacent parts of the fishing reel, and also exerting a cooling effect which may be advantageous in warm climates. Air entering into adjacency with the central outer face portion 35 of the units 15, 16 will be thrown radially by the revolving ribs 38.

Figures 7, 8:
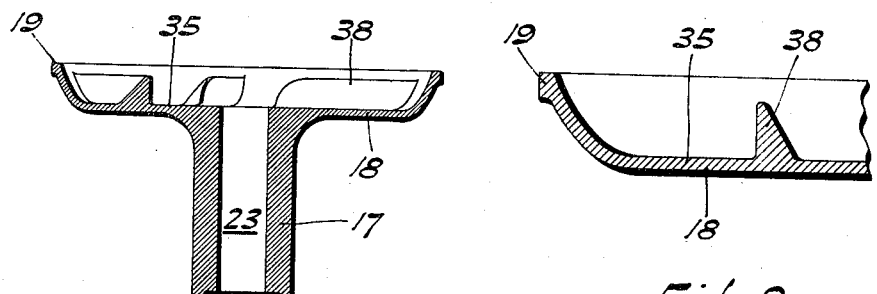
Fig. 7 is a sectional view thereof taken along line 7—7 of Fig. 6.
Fig. 8 is a fragmentary sectional view taken along line 8—8 of Fig. 6.

In the form of the units 16, 17 shown in Figs. 9 the ribs 39 are substantially of the same form as ribs 38 shown in Figs. 6, 7 and 8 except that they extend radially from the axis of the hub portion 17.

In forging the units shown in Figs. 6 to 9, inclusive, the same method described in connection with Fig. 2 may be used, but it will be understood that the punch 31 will be provided with suitable recesses into which metal from the blanks may flow during the forming operation to provide the ribs 38 or 39.

It will be understood that the spool structures herein described and illustrated are merely illustrative of the inventive principles involved, and that these principles may be utilized in modified structures and methods without departing from the spirit of the invention or the scope of the appended claims.

I claim:

1. In a spool for a fishing reel or the like, a spindle having an annular groove therein, a pair of units each comprising a hub and an integral flange, the hubs having elongated bores receiving the spindle and being in adjacency to each other with the flanges thereof in spaced relation, means securing one of the units against movement on the spindle away from the other unit, and material of the hub of the other unit extending into said annular groove.

2. In a spool for a fishing reel or the like, a spindle having an annular groove therein and a splined portion with the ridges thereof extended above the adjacent surface of the spindle, a pair of units each comprising a hub and an integral flange, the hubs having elongated bores receiving the spindle, one of said units engaging the splined portion for retention against relative angular movement and against axial displacement away from the other unit, and said other unit having the material of the hub thereof extending into said annular groove.

LAWRENCE V. WHISTLER.